(12) United States Patent
Mathieson (10) Patent No.: US 9,206,835 B2
(45) Date of Patent: Dec. 8, 2015

(54) SYSTEM AND METHOD FOR REPAIRING AND SEALING PORTIONS OF A ROOF STRUCTURE, METHOD AND APPARATUS FOR MANUFACTURING SEALING ELEMENTS

(71) Applicant: Thomas R. Mathieson, Louisville, CO (US)

(72) Inventor: Thomas R. Mathieson, Louisville, CO (US)

(*) Notice: Subject to any disclaimer, the term of this patent is extended or adjusted under 35 U.S.C. 154(b) by 0 days.

(21) Appl. No.: 14/444,323

(22) Filed: Jul. 28, 2014

(65) Prior Publication Data

US 2014/0334897 A1  Nov. 13, 2014

Related U.S. Application Data

(62) Division of application No. 12/816,246, filed on Jun. 15, 2010, now abandoned.

(60) Provisional application No. 61/251,688, filed on Oct. 14, 2009, provisional application No. 61/266,474, filed on Dec. 3, 2009.

(51) Int. Cl.
| | |
|---|---|
| *E04B 5/00* | (2006.01) |
| *F16B 43/00* | (2006.01) |
| *E04D 1/34* | (2006.01) |
| *E04D 1/36* | (2006.01) |
| *E04D 5/14* | (2006.01) |
| *E04D 15/02* | (2006.01) |
| *E04G 23/02* | (2006.01) |

(Continued)

(52) U.S. Cl.
CPC ............... *F16B 43/001* (2013.01); *E04D 1/34* (2013.01); *E04D 1/36* (2013.01); *E04D 5/145* (2013.01); *E04D 15/02* (2013.01); *E04G 23/02* (2013.01); *E04G 23/0281* (2013.01); *F16B 15/00* (2013.01); *B26F 1/40* (2013.01); *E04D 2001/3423* (2013.01); *F16B 11/006* (2013.01); *Y10T 83/04* (2015.04); *Y10T 83/8843* (2015.04); *Y10T 428/15* (2015.01)

(58) Field of Classification Search
CPC ...... F16B 43/001; F16B 11/006; F16B 15/00; E04G 23/0281; E04G 23/02; E04D 1/36; E04D 5/145; E04D 15/02; E04D 1/34
USPC ............................. 52/514, 514.5, 410; 156/91
See application file for complete search history.

(56) References Cited

U.S. PATENT DOCUMENTS

| | | | | |
|---|---|---|---|---|
| 1,583,163 A | * | 5/1926 | Munro | ............................. 52/543 |
| 1,649,635 A | | 11/1927 | Willard | |

(Continued)

FOREIGN PATENT DOCUMENTS

| | | | |
|---|---|---|---|
| JP | 02-272152 A | 11/1990 | |
| JP | 2001-173623 A | 6/2001 | |

OTHER PUBLICATIONS

PCT/US2010/062543 International Search Report and Written Opinion dated Jun. 29, 2011.

*Primary Examiner* — Brian Glessner
*Assistant Examiner* — Paola Agudelo
(74) *Attorney, Agent, or Firm* — Husch Blackwell LLP (57) ABSTRACT

A roofing sealing system and method is provided. The roofing nail seal is disposed substantially concentrically over a roofing nail. The roofing nail seal includes a body portion with an upper surface and a lower surface. An adhesive is affixed to the lower surface of the body portion for application to a head of the roofing nail.

13 Claims, 6 Drawing Sheets

(51) Int. Cl.
    *F16B 15/00*     (2006.01)
    *B26F 1/40*     (2006.01)
    *F16B 11/00*     (2006.01)

(56) References Cited

U.S. PATENT DOCUMENTS

| | | | |
|---|---|---|---|
| 2,674,026 A | 4/1954 | St. Palley | |
| 3,049,836 A * | 8/1962 | Weissman | 206/582 |
| 3,468,092 A * | 9/1969 | Chalmers | 52/543 |
| 3,485,134 A | 12/1969 | Ott | |
| 4,343,215 A | 8/1982 | Fuchs | |
| 4,686,808 A * | 8/1987 | Triplett | 52/410 |
| 4,781,508 A * | 11/1988 | Schroeder et al. | 411/452 |
| 4,787,188 A * | 11/1988 | Murphy | 52/410 |
| 4,788,807 A * | 12/1988 | Whitman | 52/410 |
| 4,982,543 A | 1/1991 | Boyd | |
| 5,204,148 A * | 4/1993 | Alexander et al. | 428/41.8 |
| 5,311,716 A * | 5/1994 | Houssin | 52/410 |
| 5,419,666 A * | 5/1995 | Best | 411/373 |
| 5,669,277 A | 9/1997 | Perrone | |
| 5,800,891 A * | 9/1998 | Wasitis | 428/42.2 |
| 5,916,103 A * | 6/1999 | Roberts | 52/552 |
| 6,148,578 A | 11/2000 | Nowacek et al. | |
| 7,712,275 B2 * | 5/2010 | Kelly | 52/520 |
| 8,210,785 B1 | 7/2012 | Gager | |
| 2006/0059825 A1 | 3/2006 | Wiercinski et al. | |
| 2006/0099370 A1 * | 5/2006 | Glass | 428/40.1 |
| 2007/0199251 A1 | 8/2007 | Sieling et al. | |
| 2007/0199276 A1 | 8/2007 | Duque | |
| 2008/0155923 A1 * | 7/2008 | Teng et al. | 52/409 |
| 2008/0209835 A1 * | 9/2008 | Margarites | 52/518 |
| 2009/0145944 A1 | 6/2009 | Shor | |
| 2010/0192509 A1 | 8/2010 | Sieling et al. | 52/741.3 |
| 2011/0289879 A1 * | 12/2011 | Binkley et al. | 52/745.21 |
| 2013/0025224 A1 * | 1/2013 | Vermilion et al. | 52/309.2 |

\* cited by examiner

SYSTEM AND METHOD FOR REPAIRING AND SEALING PORTIONS OF A ROOF STRUCTURE, METHOD AND APPARATUS FOR MANUFACTURING SEALING ELEMENTS

This application is a divisional of U.S. application Ser. No. 12/816,246 filed on Jun. 15, 2010 which claims priority to U.S. Provisional Application Nos. 61/251,688, filed on Oct. 14, 2009, and 61/266,474, filed on Dec. 3, 2009. The entire disclosures of U.S. application Ser. No. 12/816,246 and U.S. Provisional Application Nos. 61/251,688 and 61/266,474 are hereby incorporated herein by reference.

BACKGROUND OF THE INVENTION

1. Field of the Invention

The present invention generally relates to sealing systems and methods. More specifically, the present invention relates to a sealing system for sealing exposed nails on a roof and for repairing certain types of roofing damage caused by severe weather, hail and the like.

2. Background Information

Applying new or replacement shingles to a roof is a labor-intensive task. A roofer typically lays the shingles onto a roof in a specific pattern, which necessarily requires the roofer to begin laying the shingles at the lowest point of the roof and moving horizontally until one row is complete. The shingles are typically nailed to the roof along the uppermost perimeter edge and the horizontal rows progress upwardly with each shingle slightly overlapping the one below it, thereby covering the nails securing the underlying shingle. With this progression, it can be seen that at certain positions of the roof, by way of example, at edges abutting dormers, chimneys and so forth, the last course of nails is not covered. The nails that secure the uppermost row of shingles at those locations are thus exposed to the elements and if left exposed, the nails will corrode to the point that they may lose their hold on the shingles. Furthermore, the exposed nails can present an anomaly in the roofing shingle pattern, since each successive repeating shingle layer covers the other nails in the roof and, in fact, many local codes and related statutes require concealment of the nails.

Roofers typically attempt to solve this problem by using caulking to cover the nails. This is messy and an inefficient process. Moreover, the caulking, which is used to cover the nails, usually degrades after five or six years, thereby mandating that the procedure be repeated to preserve the integrity of the roof structure. Once a tube for caulking is opened, unavoidable exposure of the contents prevents reuse of leftover caulking at another job site. Thus, the caulking is wasted, being discarded for a lack of means to preserve it.

Prior art solutions such as those described below present techniques that attempt to cover and protect the nails. However, the prior art does not provide a relatively simple, inexpensive and easily installed protection for the nails, nor does the prior art provide aesthetically pleasing protection that is relatively congruent with the surrounding roof.

U.S. Pat. No. 5,419,666 to Best discloses a cover with adhesive on the bottom edges. The cover surrounds a fastener and includes a metal portion that forms a hollow portion around the head of the fastener. The cover has a diameter that expands far beyond the head of the fastener. The cover cannot be made from available roofing fabric due to the metal portion used in conjunction therewith, and it does not appear that the cover will limit the aesthetic anomaly caused by roofing nails.

U.S. Patent Application Publication No 2007/0199276 to Duque describes a seal ring with adhesive on the top and bottom. The ring is disposed below the head of a nail, i.e. a washer with adhesive. However, since the ring is below the head of the nail, it neither covers nor protects it from the elements. Furthermore, the diameter of the ring is unnecessarily larger than the head of the nail.

U.S. Pat. No. 5,204,148 to Alexander discloses a cover with an adhesive layer placed over a nail. The cover also relies on a metal portion surrounding the nail. The diameter of the cover is much larger than the head of the nail and therefore, does not save space and material.

In view of the foregoing, it will be apparent to those skilled in the art that a need exists for a roofing nail seal. This invention addresses this need in the art as well as other needs, which will become apparent to those skilled in the art from this disclosure.

SUMMARY OF THE INVENTION

It is an object of the present invention to provide a weatherproof roofing nail seal that prevents corrosion of the nails due to exposure and provides leak protection.

Another object of the present invention is to provide roof repair to severe weather damage such as hail and the like.

A further object of the present invention is to provide aesthetic protection that can eliminate or minimize the aesthetic anomaly caused by exposed roofing nails.

Still yet another object of the present invention is to provide roof repair to, for example, eliminate leak points in a roof Another object of the present invention is to provide a roofing sealing system comprising a nail and a roofing nail seal. The nail is configured for securing a roofing shingle on a roof. The nail includes a body portion and a head portion. The roofing nail seal is disposed over the nail. The roofing nail seal includes a body portion having an outer diameter forming a peripheral perimeter. The body portion has an upper surface, a lower surface and an adhesive affixed to the lower surface of the body portion for application to the head of the nail.

Yet another object of the present invention is to provide a method of sealing a nail driven into a roofing shingle that comprises: punching pre-selected shaped holes in a sheet of shingle stock material to form shaped members or cutouts therefrom; applying adhesive to at least one surface of cutouts, thereby forming a roofing nail seal; and applying the roofing nail seal to a head of the nail, the head having a diameter that is substantially concentric with a diameter of the roofing nail seal.

Yet another object of the present invention is to provide a method for manufacturing a roofing nail seal comprising punching holes in a sheet of stock material for roofing applications, the punching including feeding the sheet of stock material into a hole punching machine configured for cutting or scoring the stock material into pre-selected shapes of various sizes.

Another object of the present invention is to provide a seal production device for manufacturing roofing nail seals from roofing stock material comprising a base, a handle portion and a die unit. The base forms a substantially level surface on top and bottom and the handle portion has a cam member. The die unit is attached to the handle portion and is disposed over the base. The die unit and the base form a space for the stock material. The die unit has an exterior sleeve portion and a die extending from the cam portion. The die is operably attached to cam portion and the handle portion rotates between a rest position and an engaged position in response to operation of the lever. The rest position moves the die to a withdrawn position and the engaged portion moves the die to a cutting position.

Another object of the present invention is to provide a perforated roofing stock material comprising a plurality of seals with scored borders. The scored borders are configured to release from pressure by a hand or a finger such that the seal separates from the roofing stock material.

Yet another object of the present invention is to provide a roofing nail seal container for containing and dispensing roofing nail seals comprising a substantially tubular member and roofing nail seals disposed in the tubular member. The tubular member has an open end capped with a lid and a closed end. The tubular member is adapted to receive roofing nail seals stacked on top of one another in the tubular member for easy access by a roofer when sealing roofing nails.

Another object of the present invention is to provide a method of repairing a damaged shingle to ensure color uniformity comprising: obtaining a digital photo of the damaged shingle; providing a system for matching colors, the system including an analyzer; analyzing a digital photo to obtain the state of the color of the damaged shingle and compare the color state with colors stored in memory using the analyzer; matching the color state with a color or combination of colors stored in the memory; and outputting the color of granules to match the damaged shingle or instructions for mixing granules to obtain the color to match the damaged shingle.

In order to achieve the above-mentioned objects and other objects of the present invention, a sealing system is provided that comprises a nail and a roofing nail seal. The nail is configured for securing a roofing shingle on a roof. The nail includes a body portion and a head portion. The roofing nail seal is disposed substantially concentrically over the nail head and includes a body portion having an outer diameter forming a peripheral perimeter. The body portion has an upper surface, a lower surface, and an adhesive affixed to the lower surface of the body portion for application to the head of the nail.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF TILE PREFERRED EMBODIMENTS

Preferred embodiments of the present invention will now be explained with reference to the drawings. It will be apparent to those skilled in the art from this disclosure that the following description of the embodiments of the present invention is provided for illustration only and not for the purpose of limiting the invention as defined by the appended claims and their equivalents.

Referring initially to FIGS. 1-4, a roofing nail seal or cover 1 is shown generally at 1. The roofing nail seal 1 provides a permanent cover and protection for roofing nails. Unlike caulking which only last 5 to 6 years, the roofing nail seal 1 is likely to last the life of the roof. The roofing nail seal 1 is preferably cut from a piece of roofing stock material 10, which, by way of example, can be modular bitumen roofing material, asphalt shingle material or other suitable material for roofs. The roofing nail seal 1 can be mass-produced at a manufacturing facility then shipped to stores or construction sites. Alternatively, as will be explained in greater detail below, the seal 1 can be made individually at a job site by a roofer. The roofing stock material 10 includes a layer 12 of material having one surface 13 coated with an adhesive 14 covered by a removable release sheet layer 16. Optionally, the layer 12 can include sublayers, such as one or more high-strength polymer films and/or aluminum composite foil to match metal finish on commercial roofs, for example. The adhesive 14 can include, for example, a rubberized asphalt adhesive backing. The stock material 10 may include a self-adhering modified bitumen sheet or a reinforced self-adhering modified bitumen sheet similar to Adesoa material available from Polyglass® Co., located in Treviso, Italy, utilizing Adeso® technology. Another alternative for the stock material 10 is stock material 10 comprising LeakBarrier® Easy-Stick™ Plus Self-Adhering Roofing System from Tarco of Little Rock, Ark.

Figure 1:
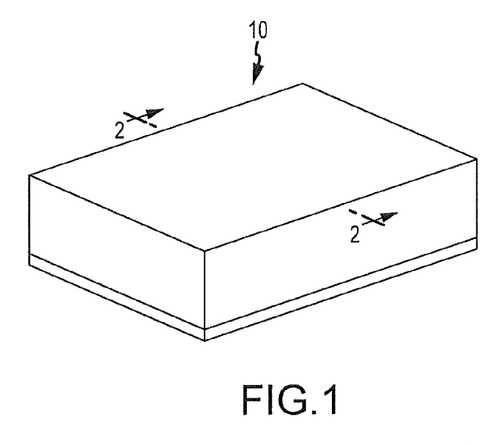
FIG. 1 is a perspective view of stock material for use in making a roofing nail seal.
Figure 2:
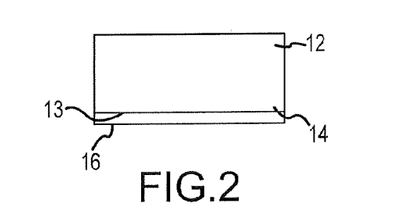
FIG. 2 is a cross-sectional view of the stock material of FIG. 1 taken along line 2L2.

In another embodiment, the roofing stock material 10 is a single layer 12 of modified bitumen sheets or rolls without adhesive 14. Rather, an adhesive is applied at the job site.

In yet another embodiment, the stock material 10 includes roofing shingles, such as asphalt shingles, with adhesive 14 on a lower surface. The adhesive 14 of this embodiment is configured to be non-adhesive at room temperature but becomes adhesive after heat is applied to the adhesive 14.

Figure 3:
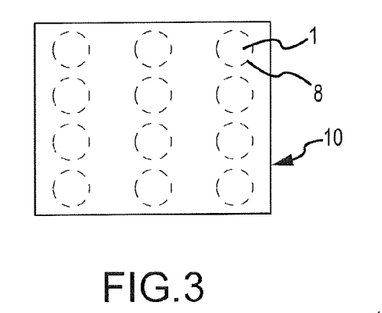
FIG. 3 is a plan view of an embodiment wherein the stock material is scored or perforated in forming the roofing nail seal.

Referring to FIG. 3, a roofing nail seal 1 is shown with its peripheral perimeter 8 having scores or perforated lines in the stock material 10. That is, the scored lines around the peripheral perimeter 8 allow the roofing nail seal 1 to be easily removed from the stock material 10 by simply pressing down on the roofing nail seal 1 while holding the stock material 10 stationary. The scored or perforated lines around the peripheral perimeter 8 of the roofing nail seal 1 can be formed, for example, using a perforating cylinder as described in U.S. Pat. No. 4,343,215, which is incorporated by reference herein, with modifications for perforating a circular shape in lieu of a square shape. The shape of the seal 1 can be square, or alternatively, it can be formed in other shapes as needed for a specific application, e.g., fitting over or in the indentation in a roofing shingle caused by a roofing nail. It will be apparent to one of ordinary skill in the art from this disclosure that other means of manufacturing the roofing nail seal 1, i.e., scoring or perforating the peripheral perimeter 8, can be done in various ways.

Figure 4:
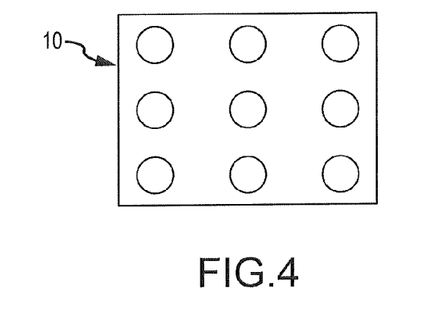
FIG. 4 is a plan view of an embodiment wherein the roofing nail seals are cut completely out of the stock material.

Referring to FIG. 4, another embodiment of seal manufacturing is disclosed. In this embodiment, the peripheral perimeter 8 is cut completely through the stock material 10 and thus, the roofing nail seal 1 is removed from the stock material 10 during manufacture. A plurality of the roofing nail seals 1 are gathered from cutting the stock material 10. An additional manufacturing step can be performed on the seals 1 to roll the edges underneath so that the raw edge is underneath the seal 1.

Figure 5:
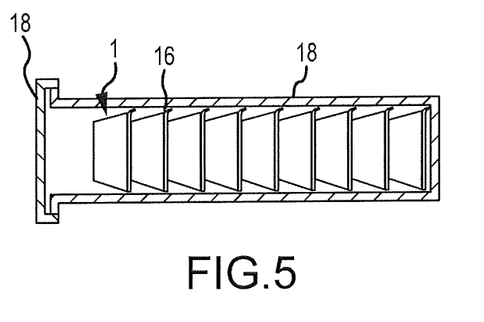
FIG. 5 is a partial cross sectional view of a container for roofing nail seals showing roofing nail seals disposed therein.

Referring to FIG. 5, the gathered roofing nail seals 1 are packaged, one after the other, in a tube 18 with an enclosed end and an open end closed with a lid 19 for shipping and sale. The tube 18 provides a convenient container for the roofer as each roofing nail seal 1 is distributed about the roof. By way of example and not of limitation, in FIG. 5, the embodiment of the roofing nail seal 1 with adhesive 14 covered with the removable release sheet layer 16 is stacked in the tube 18.

Figure 6:
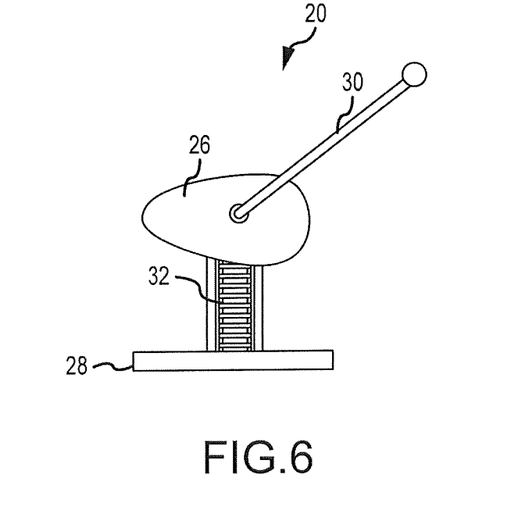
FIG. 6 is a perspective view of a seal production device for manufacturing roofing nail seals.
Figure 7:
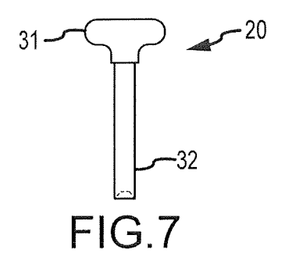
FIG. 7 is a side view of another embodiment of a seal production device.

The roofing nail seal 1 can be cut from the roofing stock material 10 at a job site using, for example, a hole-punching machine, such as that shown in U.S. Pat. Nos. 5,669,277 and 1,649,635 or a hole saw as described in U.S. Pat. No. 2,674,026, all of which are incorporated by reference herein. Alternatively, the roofing nail seal 1 can be cut or punched from the stock material 10 using a seal production device 20 as illustrated in FIGS. 6-7. While the seal 1 is illustrated as circular throughout the figures, the seal 1 can be cut into various shapes for aesthetic purposes or for utility. For example, the seal 1 could be oval, square or rectangular.

The seal production device 20 is configured to produce roofing nail seals 1 from stock material 10 at a construction site, which would typically be the shingles being used on the roof. The seal production device 20 is preferably lightweight and portable such that the roofer can make roofing nail seals 1 while on the roof, for example. The seal production device 20 includes a base 22, a handle portion 24 and a die unit 26. The base 22 forms substantially level top and bottom surfaces and provides a support, upon which the seal production device 20 can be clamped or held secure. The handle portion 24 includes a cam member 28 and the die unit 26 includes an outer sleeve portion 30 and a die 32.

Figure 8:
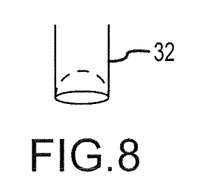
FIG. 8 is a side view of a die with a concave cutting end.

The handle portion 24 is attached to the cam member 28 and extends upwardly from the cam member 28. The die unit 26 is attached to the handle portion 24 and is disposed over the base 22. The die unit 26 extends over the base 22 to form a space 29 for the stock material 10. The die 32 is controlled by the handle portion 24. Specifically, the die 32 is movably disposed within the sleeve portion 30. Thus, when the handle portion 24 moves, the die 32 moves or extends downwardly within the sleeve portion 30 and towards the base 22. The lever 30 rotates between a rest position and an engaged position. At the rest position, the die 32 is in a withdrawn position within the die unit 26 and in the engaged position the die 32 is extended to a cutting position, where cutting of stock material 10 disposed in the space 29 occurs. Referring to FIG. 8, the die 32 is substantially cylindrical and, in one embodiment, has a concave cutting end to form a beveled edge, as will be described in greater detail below. The die 32 can also be actuated by an electric motor, hydraulics or pneumatics, for example.

FIG. 7 is another embodiment of seal production device 20 used to cut or punch the stock material 10. The seal production device 20 is a hand-held punch for selectively punching the seal 1 out of the stock material 10. The seal production device 20 has a head 31 for hammering with a hammer and a die 32 extending from the head. The seal 1 can be formed from the stock material 10 by other mechanisms such as a drill saw or the like.

Figure 9:
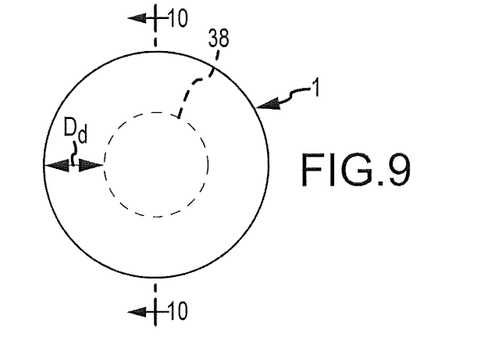
FIG. 9 is a top plan view of a roofing nail seal disposed over a head of a nail.
Figure 10:
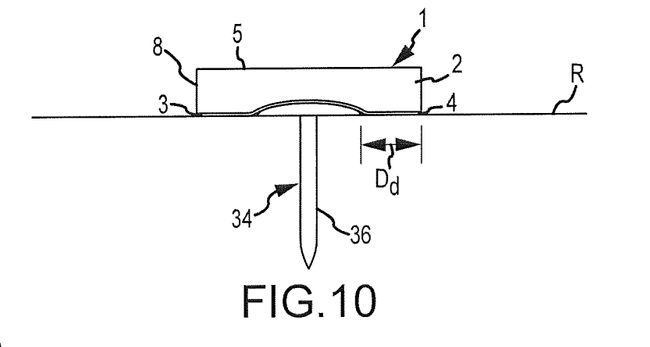
FIG. 10 is a cross-sectional view of the roofing nail seal of FIG. 9 taken along line 10-10.
Figure 11:
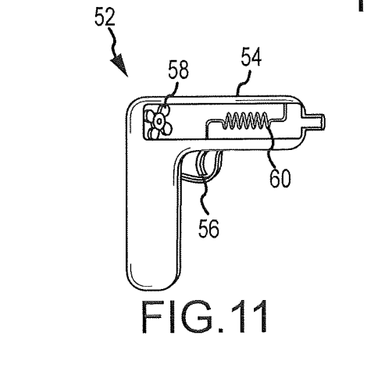
FIG. 11 is a schematic of a heat gun for use with the roofing nail seal.
Figure 12:
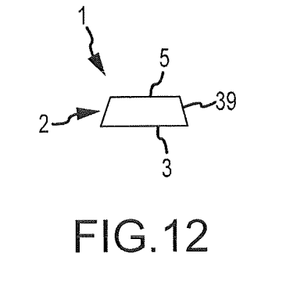
FIG. 12 is a side view of one embodiment of a roofing nail seal with an annular face.

Referring to FIGS. 9 and 10, the roofing nail seal 1 is shown disposed on a roof R and a roofing nail 34. The roofing nail seal 1 includes a body portion 2 having a lower surface 3 and an upper surface 5. The adhesive 4 is affixed to the lower surface 3 of the body portion 2. The body portion 2 may also contain sublayers as described above for layer 12 of the stock material 10. Furthermore, the roofing nail seal 1, before application, can have a removable release sheet layer pre-positioned to overlay the adhesive 4, e.g. release paper. In an alternative embodiment, the adhesive does not adhere at room temperature. Rather, a heating apparatus applies heat to the adhesive 4 to increase the temperature of the adhesive 4. The adhesive 4 then adheres to a surface. The heating apparatus can be a portable heat gun 52 as shown in FIG. 11. The heat gun 52 includes a gun housing 54, an activation mechanism 56, a blower 58 and a heat source 60. Referring to FIG. 11, the activation mechanism 56 activates the blower 58 and triggers the heat source 60 to begin generating heat. The blower 58 directs air over the heat source 60 and out of the gun housing 54. The heat source 60 can be a heated electrical coil or a butane flame.

As shown in FIGS. 9 and 10, the nail 34 has a body 36 and a head 38. The roofing nail seal 1 is applied to the head 38 of the nail 34 and a surrounding area of the roof R. The distance or difference in diameter $D_d$ between the nail head 38 and the peripheral perimeter 8 is a strategic distance for the roofing nail seal 1 of this embodiment. The distance $D_d$ can vary, however, it should be great enough to thoroughly protect the nail head 38 from the elements. For example, the distance $D_d$ can be small enough for the roofing nail seal 1 to fit into the indentation in the roofing shingle caused by the roofing nail. Alternatively, the distance $D_d$ can be larger to cover the indentation as well as the head 38 of the nail 34. The distance $D_d$ can range from, for example, about 2 to 5 mm. Preferably, the roofing nail seal 1 is disposed over the nail head 38 such that the diameter of the peripheral perimeter 8 and the nail head 38 are concentric, as shown in FIG. 5.

Figure 13:
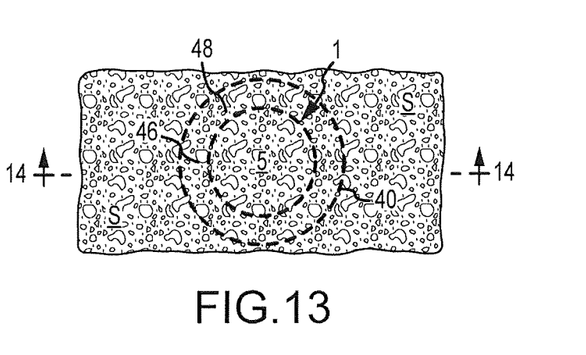
FIG. 13 is a top plan view of a roofing nail seal disposed over a head of a nail in a roofing shingle with granules matching the shingles applied.
Figure 14:
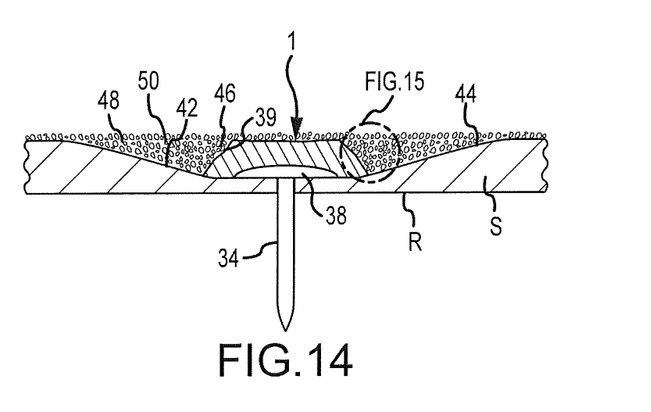
FIG. 14 is a cross-sectional view of the roofing nail seal of FIG. 13 taken along line 14-14.
Figure 15:
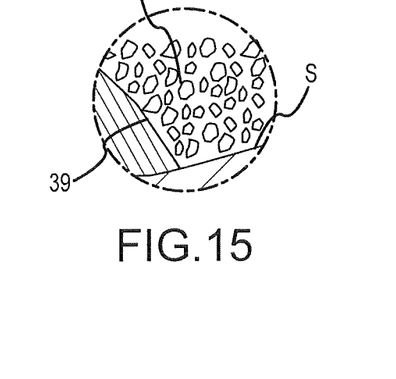
FIG. 15 is a partial magnified view of a portion of the embodiment illustrated in FIG. 14.

Referring to FIGS. 13-15, another embodiment of the roofing nail seal 1 includes a body portion 2 with a lower surface 3 having a lower diameter and an upper surface 5 having an upper diameter. In this embodiment, the lower diameter is greater than the upper diameter. The body portion 2 includes an annular face 39 connected to the upper surface 5 and the lower surface 3. The annular face 39 extends downwardly and outwardly between the upper surface 5 and the lower surface 3 and forms an annulus between the upper surface 5 and the lower surface 3. The annular face 39 can include a substantially straight slope or possess a curvature.

Referring to FIG. 14, a partial cross section of an indentation 42 formed from a roofing nail 34 driven through an installed roofing shingle S is illustrated. The annular face 39 is advantageous in that it works with an annular surface 44 of the indentation 42 to form an annular channel 46. The annular channel 46 receives an adhesive 48 that fills a volume of the annular channel 46. The adhesive 48 is preferably of the type as herein described and is capable of holding roofing granules 50 that match the granules of the roofing shingle S. Generally, granules come in a variety of different colors and are added to a roofing shingle S at the time of manufacture. For example, asphalt shingles receive granules before the asphalt is entirely cooled. Specifically, granules are pressed or embedded into a hot top layer of the asphalt shingle before cooling. Granules 50 can also be manufactured or purchased separately. In this embodiment, the roofer can obtain a container of granules 50 of a desired color from the manufacturer and apply them to the layer of freshly applied adhesive 48. By way of example, the granules may be photo-optically color matched to the shingle color in much the same way as paint coatings are color matched one to another to insure color uniformity. It will be apparent to one of ordinary skill in the art from this disclosure that any type of deformation at the top edge of the roofing nail seal 1 to form the annular channel 46 is acceptable so long as placement of the adhesive 48 and granules 50 in the formed annular channel 46 is possible.

In operation, the roofer drives the roofing nail 34 through the shingle S and inserts the roofing nail seal 1 into the indentation 42 caused by the roofing nail 34. The roofer then applies the adhesive 48 from a tube or caulking tube, for example, to the annular channel 46. The excess adhesive 48 is wiped away and roofing granules 50 are sprinkled over the top. The roofing granules 50 will stick to the adhesive 48 in the annular channel 46. Alternatively, the adhesive may come pre-packaged in a caulking tube, for example, with granules already mixed therein. Thus, the roofing nail seal 1, in conjunction with the annular channel 46 formed by the roofing nail seal 1 and the annular surface 44, the adhesive 48 and the roofing granules 50 provide a protective cover over the head 38 of the roofing nail 34 and further provide a more aesthetic appearance for the roofing shingle S and the roof as a whole.

Figure 16:
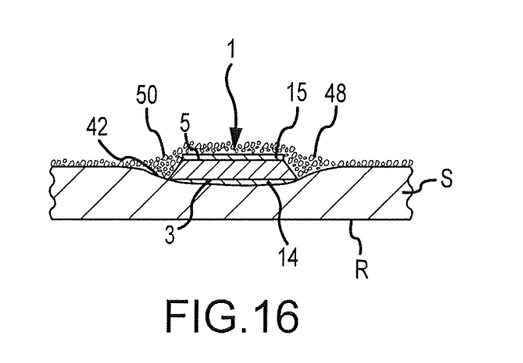
FIG. 16 is a partial cross-sectional view of an embodiment of a roofing seal.

Referring to FIG. 16, an alternate embodiment of a roofing seal 1 is shown. The roofing seal 1 is of a double-sided adhesive configuration. Specifically, the roofing seal 1 includes an adhesive layer 14 on a lower surface 3 and an adhesive layer 15 on an upper surface 5. Granules 50 are disposed at the adhesive layer 15 to aid in blending with the surrounding shingle S. In the shingles S shown in FIGS. 16 and 17, the indentation 42 is an anomaly in the shingle S caused by severe weather or weather in general over time, for example. In operation, the roofer places the roofing seal 1 with the double-sided adhesive to fill or substantially fill the indentation 42. The roofing seal 1 advantageously provides a seal to correct the damaged shingles S, which would otherwise leak. The roofer preferably applies an adhesive 48 around the roofing seal 1 and also applies granules 50 to the adhesive layer 15 and to the adhesive 48 to match substantially the appearance of the roofing seal 1 with that of the surrounding shingle S.

Figure 17:
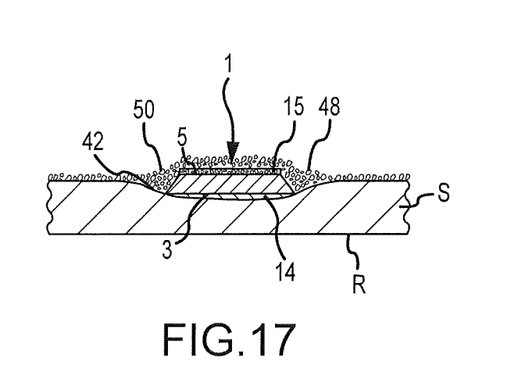
FIG. 17 is a partial cross-sectional view of an alternative embodiment to the roofing seal illustrated in FIG. 16.

Referring to FIG. 17, another alternate embodiment of the roofing nail seal 1 is illustrated. The embodiment illustrated in FIG. 17 is substantially the same as the embodiment in FIG. 16, except that the adhesive layer 15 includes granules integrate therein. Specifically, the roofing seal 1 includes an adhesive layer 14 on a lower surface 3 and an adhesive layer 15 on an upper surface 5. The adhesive layer 15, having integral granules 50, can be applied at the manufacturer or after placement of the roofing nail seal 1 with a caulking tube, for example.

Figure 18:
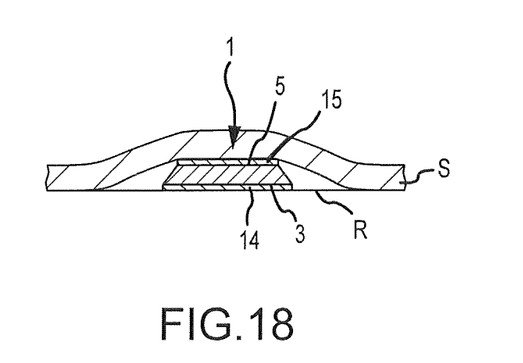
FIG. 18 is a partial cross-sectional view of the roofing seal in FIG. 16 disposed under a shingle to secure the shingle to the roof.

Referring to FIG. 18, another embodiment is illustrated in which the roofing seal 1 discussed in regards to FIG. 16 is used to secure a shingle S to the roof R. In cold weather or in difficult corners, for example, the shingles S will often not lie correctly or simply will not adhere to the roof R. The roofing seal 1 provides an advantageous alternative to nails or caulking adhesive because the roofing seal 1 facilitates attachment quickly. Specifically, the roofing nail seal 1 is disposed underneath the shingle on the roof R to provide an instant seal for the roofer trying to lay shingles S in cold weather, for example. The roofer merely places the roofing seal 1 between the shingle S and the roof R at a desired location and applies pressure to the shingle S. The double-sided adhesive on the roofing seal 1 secures the roofing seal 1 between the shingle S and the roof R, thereby securing and immobilizing the shingle S to the roof R.

Figure 19:
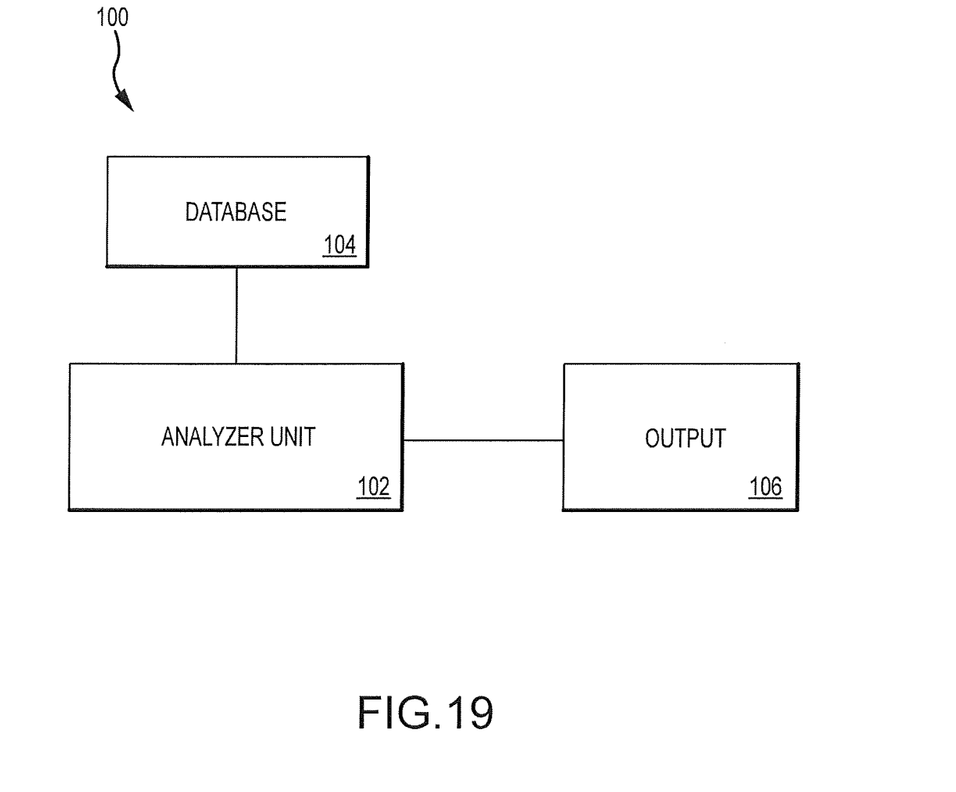
FIG. 19 is schematic diagram of a system for matching new repair materials with installed materials.

Referring to FIG. 19, a system 100 for matching new repair materials with installed materials is provided. The system 100 includes an analyzer unit 102 and database 104 operatively connected to the analyzer unit 102. The analyzer unit 102 is preferably a computer system configured to analyze digital photos. Overtime, installed exterior building materials, such as shingles, lose their original color from rain, snow and intense sunlight. Installed building materials can also be damaged from hail. Even if the same product is used to repair the installed building materials, the color may not match since there has been exposure to the weather. The analyzer unit 102 analyzes digital photos of damaged building materials to determine the proper color match. Database 104 stores information on available colors of the granules used for shingles. Communicating with the database 104 to determine colors and color combinations, the analyzer unit 102 matches the color or color and texture of the shingles. The analyzer unit 102 first attempts to match the color of the installed building materials with standard colors available and stored in the database 104. However, if the analyzer unit 102 determines that this is not possible, the analyzer unit 102 then mixes the standard colors to obtain an appropriate matching color to the installed building materials. The instructions for mixing the standard colors including, for example, proportions of standard colors and preparation steps are provided to the user by the analyzer unit 102 as output 106.

Dimensions and size relative to other parts in the Figures may be inexact and altered for illustrative purposes. Thus, it will be apparent to one of ordinary skill in the art from this disclosure that the relative size of the parts can be altered as desired.

In understanding the scope of the present invention, the term "comprising" and its derivatives, as used herein, are intended to be open ended terms that specify the presence of the stated features, elements, components, and/or groups, but do not exclude the presence of other unstated features, elements, components, and/or groups. The foregoing also applies to words having similar meanings such as the terms, "including", "having" and their derivatives. The terms of degree such as "substantially", "about" and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

What is claimed is:

1. A roofing sealing system for sealing an exposed nail driven into an asphalt shingle causing an indentation in the shingle, comprising:
   a nail configured for securing an asphalt roofing shingle on a roof, the nail including a body portion and a head portion, the head portion being exposed on an asphalt shingle roof; and
   a roofing nail seal configured to fit into said indentation, the nail seal including a body portion having an outer diameter forming a peripheral perimeter, the body portion having an upper surface and a lower surface, said roofing nail seal body portion being disposed in direct contact with the head portion of said exposed nail, and an adhesive affixed to the lower surface of the body portion of the roofing nail seal compatible for application directly to the head portion of the exposed nail and the surrounding asphalt shingle.

2. The system of claim 1, wherein the roofing nail seal body includes a high-strength polymer film.

3. The system of claim 1, wherein the adhesive includes asphalt.

4. The system of claim 1, wherein the thickness of the roofing nail seal body portion is greater than about 40 mils.

5. The system of claim 1, wherein the roofing nail seal has a circular or oval shape.

6. The system of claim 1, wherein the roofing nail seal has a square or rectangular shape.

7. The system of claim 1, wherein the roofing nail seal body portion includes asphalt shingle material.

8. The system of claim 1 wherein the roofing nail seal body portion is made from an asphalt shingle material.

9. A roofing sealing system for asphalt shingles comprising:
   a plurality of asphalt roofing shingles each secured with a nail and having an indentation caused by the nail;
   each nail configured for securing an asphalt roofing shingle on a roof including a body portion and a head portion; and
   a roofing nail seal including a body portion having an outer diameter forming a peripheral perimeter, the body portion having an upper surface, a lower surface and an annular face connecting the upper surface and the peripheral perimeter, said roofing nail seal body portion being disposed over the head portion of said nail, and an adhesive affixed to the lower surface of the body portion compatible for application to the head portion of the nail and the surrounding asphalt shingle.

10. The system of claim 9 wherein the indentation has an annular wall and the annular face and the annular wall form an annular channel.

11. The system of claim 10 wherein the annular channel contains adhesive therein.

12. The system of claim 11 wherein the annular channel contains roofing shingle granules therein.

13. The system of claim 9 wherein said roofing nail seal body portion is disposed over the head portion of said nail and over the indentation caused by said nail.

* * * * *